United States Patent
Martindale et al.

(10) Patent No.: US 8,297,136 B2
(45) Date of Patent: Oct. 30, 2012

(54) INSTRUMENTATION ARRANGEMENT

(75) Inventors: Ian Graham Martindale, Ashbourne (GB); Robert Daniel Anthony, Derby (GB)

(73) Assignee: Rolls-Royce PLC, London (GB)

( * ) Notice: Subject to any disclaimer, the term of this patent is extended or adjusted under 35 U.S.C. 154(b) by 638 days.

(21) Appl. No.: 11/920,729

(22) PCT Filed: Apr. 21, 2006

(86) PCT No.: PCT/GB2006/001475
§ 371 (c)(1),
(2), (4) Date: Mar. 3, 2008

(87) PCT Pub. No.: WO2006/125939
PCT Pub. Date: Nov. 30, 2006

(65) Prior Publication Data
US 2009/0031801 A1    Feb. 5, 2009

(30) Foreign Application Priority Data
May 21, 2005  (GB) .................................. 0510440.1

(51) Int. Cl.
*G01D 21/00*  (2006.01)
(52) U.S. Cl. ...................................................... 73/866.5
(58) Field of Classification Search .................. None
See application file for complete search history.

(56) References Cited

U.S. PATENT DOCUMENTS

| | | | | |
|---|---|---|---|---|
| 3,348,414 A * | 10/1967 | Waters et al. | ................. | 374/115 |
| 4,298,312 A * | 11/1981 | MacKenzie et al. | .......... | 415/118 |
| 4,605,315 A * | 8/1986 | Kokoszka et al. | ............ | 374/144 |
| 4,902,139 A * | 2/1990 | Adiutori | ....................... | 374/137 |
| 4,916,715 A * | 4/1990 | Adiutori | ......................... | 374/29 |
| 5,563,510 A | 10/1996 | Gorrell et al. | | |
| 5,612,497 A | 3/1997 | Walter et al. | | |
| 6,354,153 B1 | 3/2002 | Weiblen et al. | | |
| 6,518,565 B1 | 2/2003 | Wu et al. | | |
| 2004/0211875 A1 | 10/2004 | Wisniewski et al. | | |

FOREIGN PATENT DOCUMENTS

| | | |
|---|---|---|
| DE | 20 2004 009112 U1 | 8/2004 |
| GB | 1 059 465 A | 2/1967 |
| GB | 1 183 198 A | 3/1970 |
| GB | 2 293 923 A | 4/1996 |
| GB | 2 314 164 A | 12/1997 |
| GB | 2 318 873 A | 5/1998 |
| WO | WO 2004/051194 A1 | 6/2004 |

* cited by examiner

*Primary Examiner* — Peter MacChiarolo
*Assistant Examiner* — Alex Devito
(74) *Attorney, Agent, or Firm* — Oliff & Berridge, PLC

(57) ABSTRACT

An instrumentation arrangement for a component includes a number of measurement devices mounted on a baseplate. The baseplate is shaped to correspond to the surface of the component in use, and has attachment features engageable with features of the component, so that the rake can be easily installed and removed without modification of the component.

14 Claims, 1 Drawing Sheet

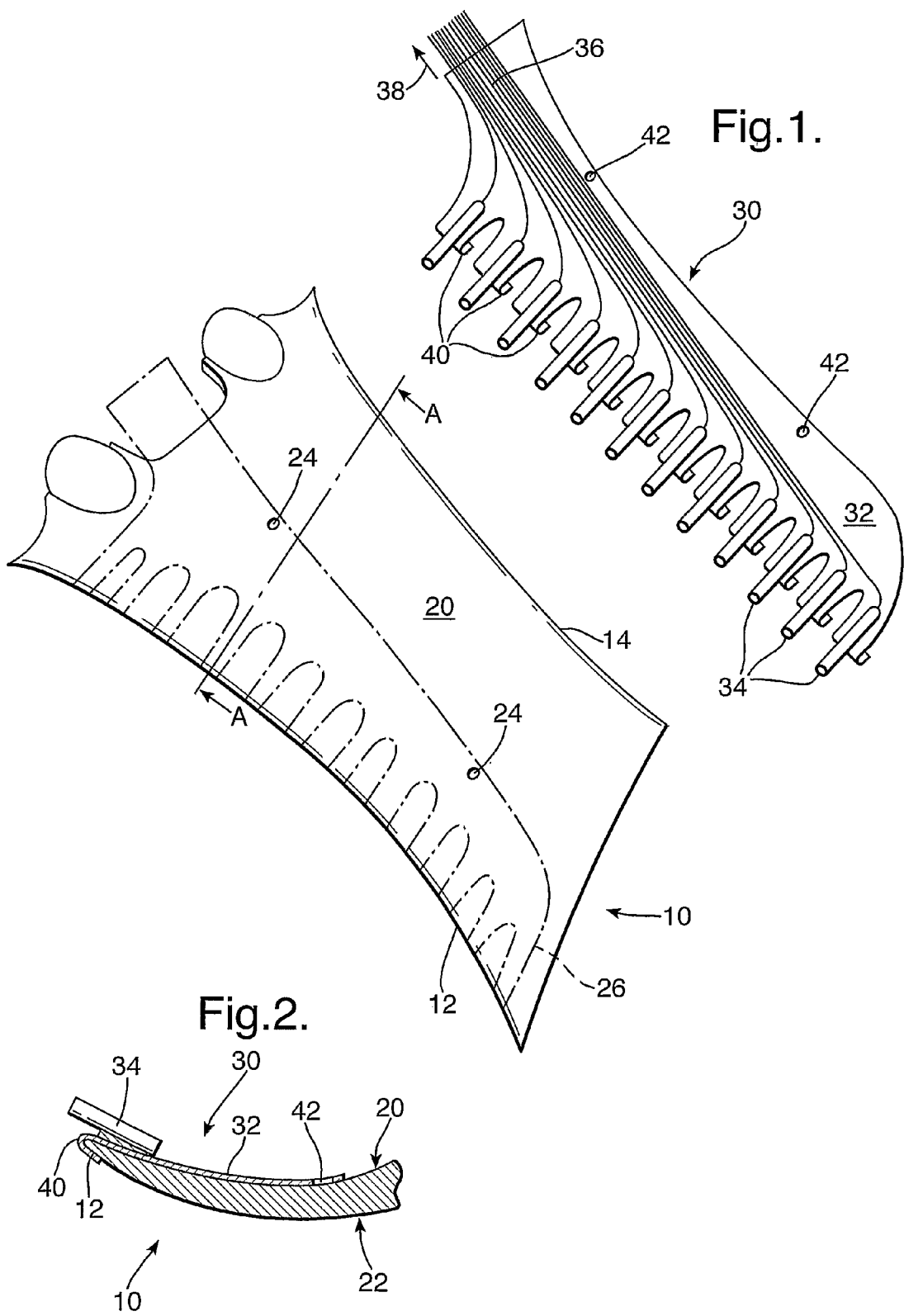

INSTRUMENTATION ARRANGEMENT

This invention relates to instrumentation, and particularly to measurement devices intended for use on stationary components of gas turbine engines.

It is a requirement when developing gas turbine engines that the airflow conditions at various positions in the gas duct are measured, to assess the performance of the engine's components and to compare it with theoretical calculations. This usually takes the form of air pressure and temperature measurement collected by Pitot tubes, thermocouples or other devices at convenient places in the compressor. The performance of such a measurement device may be improved by shrouding it. This makes the device less sensitive to changes in yaw angle, and thus improves the measurement accuracy. One such device, a shrouded Pitot tube, is sometimes referred to as a Kiel® probe.

The static structure of the gas turbine engine is commonly used to mount these measurement devices, and the airflow or signal is led from the compressor to measurement equipment by means of tubes and wires fixed to the structure.

Conventionally, Pitot tubes, thermocouples or other measurement devices are individually fixed to the structure, for example to a static aerofoil or vane, by drilling holes in the vane and welding in fixing pins to which the devices are welded. The leadouts from the devices are fixed to the vane aerofoil surface by welded-on sheet metal shim clips. This method is expensive and time-consuming, and has the further disadvantage that the drilling and welding irreparably damage the vane.

Because the airflow conditions vary across the duct, it is usual to mount several measurement devices at one position in the engine, radially spaced across the duct. Such an arrangement of measuring devices is commonly referred to as a rake.

As well as measuring the airflow conditions in an engine during its development, it would also be desirable to measure these airflow conditions when a gas turbine engine is being overhauled or repaired. Such measurements could allow damage or wear in the engine to be detected without the need to dismantle the engine. Unfortunately, because the mounting of the measurement devices damages the engine components (as explained above) it is rarely possible to make such measurements on engines in service, and instead the engine must be stripped or dismantled for its condition to be assessed. This is, of course, very costly in time and money.

It is therefore an object of this invention to provide the measurement capability of an instrumented vane, without the time-consuming preparation required in known techniques, and without causing damage to the vane. The resulting savings in time and cost will permit wider use of instrumentation during engine development, so that measurements may be made on more engine tests. It will also permit the use of such instrumentation as a diagnostic tool on engines in service.

According to the invention, an instrumentation arrangement for a component comprises a baseplate to which is attached at least one measurement device, characterised in that the baseplate comprises attachment features engageable in use with the component, to permit installation and removal without modification of the component.

The component may comprise a surface and the baseplate may be shaped to correspond to the surface.

Alternatively, the component may comprise a surface and the baseplate may be moulded in use to correspond to the surface. The baseplate may be cured after moulding to ensure it retains its shape.

The attachment features may comprise hooks engageable with the component.

The attachment features may comprise fasteners engageable in holes in the component. The holes may be manufacturing datum holes.

The baseplate may further comprise a tang engageable in use with structure associated with the component. The structure may be a casing or a mounting ring.

The tang may provide location of the baseplate in at least a first direction, and the attachment features may provide location of the baseplate in at least a second, different direction. Preferably, the first direction is radial and the second direction is axial.

The component may be a component of a gas turbine engine. The component may be a vane of a gas turbine engine and the hooks may be engageable with the leading edge of the vane.

The arrangement may be at least partially secured to the component in use adhesively, magnetically or by suction.

The measurement device may be selected from the list consisting of: Pitot tube, thermocouple, miniature camera, laser sensor, densimeter, mass flow detector, particle detector. At least one measurement device may be protected by a shroud.

The measurement device may be attached to the baseplate by brazing or welding or adhesive bonding or mechanical fasteners.

The arrangement may further comprise at least one measurement device leadout tube or wire. The leadout tube or wire may be secured to the baseplate. The leadout tube or wire may be secured by clipping.

The invention will now be described, by way of example, making reference to the attached drawings in which FIG. 1 shows an instrumentation arrangement according to the invention, together with a vane of a gas turbine engine; and FIG. 2 shows a partial section on the line AA of FIG. 1.

In FIG. 1, a fan outlet guide vane (OGV) 10 has a leading edge 12 and a trailing edge 14. The vane 10 has a concave pressure surface 20 and, on its opposite side, a convex suction surface 22 (indicated in FIG. 2). Two manufacturing datum holes 24 have been left in the pressure surface 20 by the vane manufacturing process. In use, a set of vanes 10 is mounted within an annular OGV mounting ring (the position of which is indicated by a dashed line 44).

FIG. 1 also shows an instrumentation arrangement 30 according to the invention. The arrangement 30 comprises a baseplate 32. The baseplate is shaped to correspond to the contour of the pressure surface 20 of the vane 10. The baseplate is extended at one end, to form a tang 33 with an end face 35. A number of shrouded Pitot tubes 34 are welded to the baseplate. In this embodiment, twelve shrouded Pitot tubes 34 are provided. Leadout tubes 36 from the Pitot tubes 34 are clipped to the baseplate 32, and led out to measuring equipment 38 (not shown).

The baseplate 32 has hooks 40 along one edge, which in use are engageable with the leading edge 12 of the vane 10. In this embodiment, twelve hooks 40 are used. The rake 30 is located by the hooks 40 on the pressure surface 20 of the vane 10, approximately in the position indicated by the dashed lines 26. This provides a positive axial location for the baseplate. At the same time, the end face 35 of the baseplate tang 33 locates against the inner surface of the OGV mounting ring 44. This provides a positive radial location for the baseplate. Because the baseplate 32 is contoured to conform closely to the surface 20 of the vane 10, the combination of these three features (hooks 40, end face 35 and contoured baseplate)

provides accurate and repeatable location of the baseplate 32 on the vane 10. Consequently, the locations of the shrouded Pitot tubes 34 relative to the vane 10 are accurately known. Suitable fasteners (not shown), such as bolts, pass through holes 42 in the baseplate 32 and engage with the datum holes 24 in the vane 10, to secure the rake 30 to the vane 10.

Because the shape of the baseplate 32 corresponds to the contour of the pressure surface 20 of the vane 10, it fits closely in use and causes the minimum disturbance to the aerodynamic behaviour of the vane 10.

FIG. 2 shows a section through the line A-A of FIG. 1, with the arrangement 30 installed on the vane 10. One of the hooks 40 is visible, and a shrouded Pitot tube 34 can also be seen adjacent the leading edge 12 of the vane 10. The previously described fasteners (not shown) pass through the holes 42 to secure the baseplate 32 to the vane 10.

When the invention is to be used on a service engine, the surface of the vane 10 may be worn or damaged. The contour of the baseplate 32 may not then correspond precisely to the contour of the vane surface 20. In an alternative aspect of this invention, the baseplate 32 is partly or wholly made from a mouldable, curable material. The baseplate 32 can be moulded exactly to the contour of the vane surface 20, taking account of any wear or damage. Once cured, the contour of the baseplate 32 will then be maintained throughout the subsequent testing.

Such an instrumentation arrangement, incorporating a mouldable baseplate, could be arranged to fit to a number of different vanes or to a number of different gas turbine engines. This would advantageously reduce the inventory needed at service locations in the field, because a small number of rakes could be adapted to serve all purposes.

It will be appreciated that various modifications may be made to the embodiment described in this specification, without departing from the scope of the invention claimed.

As mentioned in the introductory part of this specification, other types of shrouded or unshrouded measuring devices may be installed. Examples of suitable devices are Pitot tubes, thermocouples, miniature cameras, laser sensors, densimeters, mass flow detectors and particle detectors, but the skilled reader will appreciate that this list is not exhaustive and that the invention could be applied to any measuring device of a suitable size. A single rake may comprise several measurement devices of different types.

The measurement devices may be attached to the baseplate by means other than welding, for example by brazing, by adhesive bonding or by mechanical fasteners. Likewise, the leadout tubes or wires may be secured to the baseplate by alternative means.

Lesser or greater numbers of measurement devices and hooks may be employed, to suit the particular vane and the required measurements.

The baseplate may be secured to the vane surface by adhesive bonding or by any other suitable means. If the vane is of suitable material the baseplate may be secured magnetically. With the addition of a seal around the outside of the baseplate, it may be secured by suction. Such alternative securing methods may be used instead of, or in addition to, the mechanical fasteners described in the specific description.

The invention thus provides an instrumentation arrangement that can be readily attached to and removed from a component of an engine, without the need for any modification of the component. The component is left undamaged after the rake is removed. Because the baseplate is shaped to correspond to the component to which it is mounted in use, the effect on the aerodynamic behaviour of the component is minimised, and the measurements will be more accurate and representative.

The invention claimed is:

1. An instrumentation arrangement for a vane of a gas turbine engine, the vane having a pressure surface and a leading edge, the instrumentation arrangement comprising:
    a baseplate to which is attached at least one measurement device; and
    a plurality of measurement devices, the baseplate being shaped to correspond to the pressure surface of the vane, the baseplate having hooks configured to engage the leading edge of the vane and a tang configured to engage a mounting ring associated with the vane, the baseplate configured to be secured to the pressure surface by fasteners configured to engage holes in the pressure surface.

2. The instrumentation arrangement of claim 1, in which the baseplate is cured to ensure that the baseplate retains its shape.

3. The instrumentation arrangement of claim 1, in which the holes are manufacturing datum holes.

4. The instrumentation arrangement of claim 1, in which in use the tang provides location of the baseplate in at least a first direction, and the fasteners provide location of the baseplate in at least a second, different direction.

5. The instrumentation arrangement of claim 4, in which the first direction is radial and the second direction is axial.

6. The instrumentation arrangement of claim 1, which in use is at least partially secured to the vane adhesively, magnetically or by suction.

7. The instrumentation arrangement of claim 1, in which at least one of the measurement devices is protected by a shroud.

8. The instrumentation arrangement of claim 1, in which the measurement devices are attached to the baseplate by brazing or welding or adhesive bonding or mechanical fasteners.

9. The instrumentation arrangement of claim 1, further comprising at least one measurement device leadout tube or wire.

10. The instrumentation arrangement of claim 9, in which the leadout tube or wire is secured to the baseplate.

11. The instrumentation arrangement of claim 10, in which the leadout tube or wire is secured by clipping.

12. The instrumentation arrangement of claim 1, wherein the measurement devices are selected from a group consisting of a pitot tube, a thermocouple, a miniature camera, a laser sensor, a densimeter, a mass flow detector and a particle detector.

13. The instrumentation arrangement of claim 2, wherein the baseplate is configured to retain its shape when the baseplate is not mounted on the vane.

14. The instrumentation arrangement of claim 1, wherein at least one of said plurality of measurement devices is disposed on one of said hooks.

* * * * *